US008352379B2

(12) United States Patent
Fulton et al.

(10) Patent No.: US 8,352,379 B2
(45) Date of Patent: Jan. 8, 2013

(54) METHOD FOR CERTIFYING AND VERIFYING DIGITAL WEB CONTENT USING PUBLIC CRYPTOGRAPHY (75) Inventors: Nicholas Fulton, New York, NY (US); James Matthew Butler, Northampton (GB); Mark Anthony Curtis, Compton (GB); David Parrott, Kent (GB); Miles Jonathan Whitehead, Middlesex (GB); Hui Wu, Essex (GB)

(73) Assignee: Reuters Limited, London (GB)

( * ) Notice: Subject to any disclaimer, the term of this patent is extended or adjusted under 35 U.S.C. 154(b) by 1145 days.

(21) Appl. No.: 10/203,743

(22) PCT Filed: Jan. 29, 2001

(86) PCT No.: PCT/GB01/00345
§ 371 (c)(1),
(2), (4) Date: Apr. 24, 2003

(87) PCT Pub. No.: WO01/60020
PCT Pub. Date: Aug. 16, 2001

(65) Prior Publication Data
US 2003/0158823 A1 Aug. 21, 2003

(30) Foreign Application Priority Data
Feb. 14, 2000 (GB) .................................. 0003365.4

(51) Int. Cl.
*G06F 17/00* (2006.01)
(52) U.S. Cl. .............................. 705/75; 705/50; 709/229
(58) Field of Classification Search .......... 705/1, 50–80; 709/229
See application file for complete search history.

(56) References Cited

U.S. PATENT DOCUMENTS 5,109,413 A * 4/1992 Comerford et al. ............. 705/54
(Continued)

FOREIGN PATENT DOCUMENTS

GB 2346460 A 9/2000
(Continued)

OTHER PUBLICATIONS

N. Islam et al., "A Flexible Security Model for Using Internet Content", IBM Thomas J. Watson Research Center Publication, Jun. 28, 1997, XP002138803 Abstract; Figure 2.
(Continued)

*Primary Examiner* — Calvin L Hewitt, II
*Assistant Examiner* — John M Winter
(74) *Attorney, Agent, or Firm* — Banner & Witcoff, Ltd.

(57) ABSTRACT

There is provided a method of, computer programs for and apparatus for providing and accessing digital content such as a news item. A news provider generates a news item, creates a digitally signed version of the news item and packages them together with a digital certificate issued by a certificate authority containing the public key required to decrypt the digitally signed version. The package is posted to a server and is transmitted, or made available or transmission, over a public data network together with a computer program for verifying the news item. A receiving party receives, over the public data network, the package at a client device and is provided with means for launching, and if necessary first downloading, the verifying program. The verifying program uses the public key contained in the certificate to verify the digitally signed news item. Before being first used to verify a news item, the verifying program receives a shared secret from the receiving party which is stored locally to the client device and is used by the verifying program to confirm that it performed the verification process.

10 Claims, 7 Drawing Sheets

U.S. PATENT DOCUMENTS

| | | | | |
|---|---|---|---|---|
| 5,136,647 | A * | 8/1992 | Haber et al. | 713/178 |
| 5,371,796 | A * | 12/1994 | Avarne | 713/170 |
| 5,392,351 | A * | 2/1995 | Hasebe et al. | 705/51 |
| 5,457,746 | A * | 10/1995 | Dolphin | 705/51 |
| 5,602,933 | A * | 2/1997 | Blackwell et al. | 382/116 |
| 5,615,268 | A | 3/1997 | Bisbee et al. | |
| 5,629,980 | A * | 5/1997 | Stefik et al. | 705/54 |
| 5,659,616 | A * | 8/1997 | Sudia | 705/76 |
| 5,673,316 | A * | 9/1997 | Auerbach et al. | 705/51 |
| 5,703,951 | A * | 12/1997 | Dolphin | 705/51 |
| 5,715,403 | A * | 2/1998 | Stefik | 705/44 |
| 5,748,738 | A * | 5/1998 | Bisbee et al. | 713/176 |
| 5,765,152 | A * | 6/1998 | Erickson | 707/9 |
| 5,765,176 | A * | 6/1998 | Bloomberg | 715/209 |
| 5,815,657 | A | 9/1998 | Williams et al. | |
| 5,838,812 | A * | 11/1998 | Pare et al. | 382/115 |
| 5,872,848 | A * | 2/1999 | Romney et al. | 713/176 |
| 5,892,900 | A * | 4/1999 | Ginter et al. | 726/26 |
| 5,933,498 | A * | 8/1999 | Schneck et al. | 705/54 |
| 5,963,649 | A | 10/1999 | Sako | |
| 5,987,440 | A | 11/1999 | O'Neil et al. | |
| 5,991,399 | A * | 11/1999 | Graunke et al. | 380/279 |
| 6,005,945 | A * | 12/1999 | Whitehouse | 380/51 |
| 6,006,332 | A * | 12/1999 | Rabne et al. | 726/6 |
| 6,021,202 | A * | 2/2000 | Anderson et al. | 705/54 |
| 6,135,646 | A * | 10/2000 | Kahn et al. | 709/217 |
| 6,151,676 | A * | 11/2000 | Cuccia et al. | 713/176 |
| 6,209,095 | B1 * | 3/2001 | Anderson et al. | 713/176 |
| 6,226,618 | B1 * | 5/2001 | Downs et al. | 705/1 |
| 6,237,096 | B1 * | 5/2001 | Bisbee et al. | 713/178 |
| 6,289,455 | B1 * | 9/2001 | Kocher et al. | 713/194 |
| 6,327,656 | B2 * | 12/2001 | Zabetian | 713/176 |
| 6,330,549 | B1 * | 12/2001 | Merkle | 705/51 |
| 6,341,349 | B1 * | 1/2002 | Takaragi et al. | 713/168 |
| 6,356,937 | B1 * | 3/2002 | Montville et al. | 709/206 |
| 6,367,013 | B1 * | 4/2002 | Bisbee et al. | 713/178 |
| 6,370,249 | B1 * | 4/2002 | Van Oorschot | 380/277 |
| 6,435,410 | B2 * | 8/2002 | Edens et al. | 235/454 |
| 6,580,683 | B1 * | 6/2003 | Braitberg et al. | 369/275.3 |

FOREIGN PATENT DOCUMENTS

| | | |
|---|---|---|
| JP | 11212455 A | 8/1999 |
| WO | 0011619 A1 | 3/2000 |
| WO | 0046681 A1 | 8/2000 |

OTHER PUBLICATIONS

Bruno L., "Certificate Authorities: Who Do You Trust?", Data Communications, McGTraw Hill. New York, US, vol. 27, No. 4, Mar. 21, 1998, pp. 54-63, XP000740967 ISSN: 0363-6399 Abstract; Figure 1. WPI Abstract Accession No. 1999-498452/42.

"A Flexible Security Model for Using Internet Content," Rangachari Anand et al., Symposium on Reliable Distributed Systems 1997, pp. 89-96.

"Software Publisher Digital IDs for Microsoft Authenticode Technology," downloaded from http://verisign.com/rsc/gd/dev/authenticode/intro.html.

"Verisign and Netscape Increased Security for Internet Distribution of Java Applets and Javascript," downloaded from http://verisign.com/press/product/obj.html.

GB Search Report in Application No. GB0003365.4 dated May 22, 2001.

* cited by examiner

720 — Reuters News - Microsoft Internet Explorer http://rsq/signed/news/n4288842.htm Reuters

*The truth. Deal with it*

---

722 — Soccer-Asians end boycott threat to 2002 World Cup finals

ZURICH, Sept 7 (Bloomberg) - An Asian boycott of the 2002 World Cup was averted on Tuesday when FIFA president Sepp Blatter and Asian confederation boss sultan Ahmad Shah reached an agreement on the allocation of teams for the finals.

The Asian confederation will remain with four and a half berths but FIFA said in a statement it will reconsider the allocation of Asian entries for the 2006 World Cup.

The four and a half berths comprise the two co-hosts Japan and South Korea, two qualifiers and one Asian team that will play-off against a European team for a place in the finals.

"I am happy to resolve the differences between FIFA and my Confederation regarding number of teams for the 2002 finals," said Ahmad Shah, in a statement.

"Now we can move forward for the good of the game in Asia and devote our full attention to the success of the World Cup."

The Asian Confederation's participation in the World Cup was thrown into doubt and after the AFC delegation walked out of a FIFA extra-ordinary congress in July, after world governing body refused to increase the number of Asian berths in the finals.

As a result of the accord signed in Zurich on Tuesday, an extra-ordinary congree of the Asian Football Confederation planned for Kuala Lumpur on October 10 has been cancelled.

X    The text of the document has been altered
     Your password is 'The cat sat on the mat'    REUTERS

METHOD FOR CERTIFYING AND VERIFYING DIGITAL WEB CONTENT USING PUBLIC CRYPTOGRAPHY

CROSS REFERENCE TO RELATED APPLICATIONS

This is a U.S. National Phase Application under 35 U.S.C. §371. Applicants claim the benefit of PCT/GB01/00345 filed Jan. 29, 2001, published in English under PCT Article 21(2), which claims priority to Great Britain Application 0003365.4, which was filed Feb. 14, 2000. The entire contents of PCT/GB01/00345 and 0003365.4 are incorporated herein by reference.

TECHNICAL FIELD

This invention relates generally to methods of, computer programs for, and apparatus for providing and accessing digital content. More particularly, this invention relates to, but is not limited to, a method of and computer programs for transmitting, making available for transmission, accessing, or receiving content over a public data network such as the Internet.

BACKGROUND

Public key infrastructure (PKI) decryption and verification capabilities are built into commercially available browsers such as Netscape Navigator™ and Microsoft Internet Explorer™. Microsoft Authenticode™ is a prior art system for securing the distribution of program code over the Internet which uses PKI (see "Software Publisher Digital IDs for Microsoft Authenticode Technology" at http://www.verisign.com/rsc/gd/dev/authenticode/intro.html). The functioning of Microsoft Authenticode™ will be discussed in detail below with reference to FIG. 1.

Figure 1:
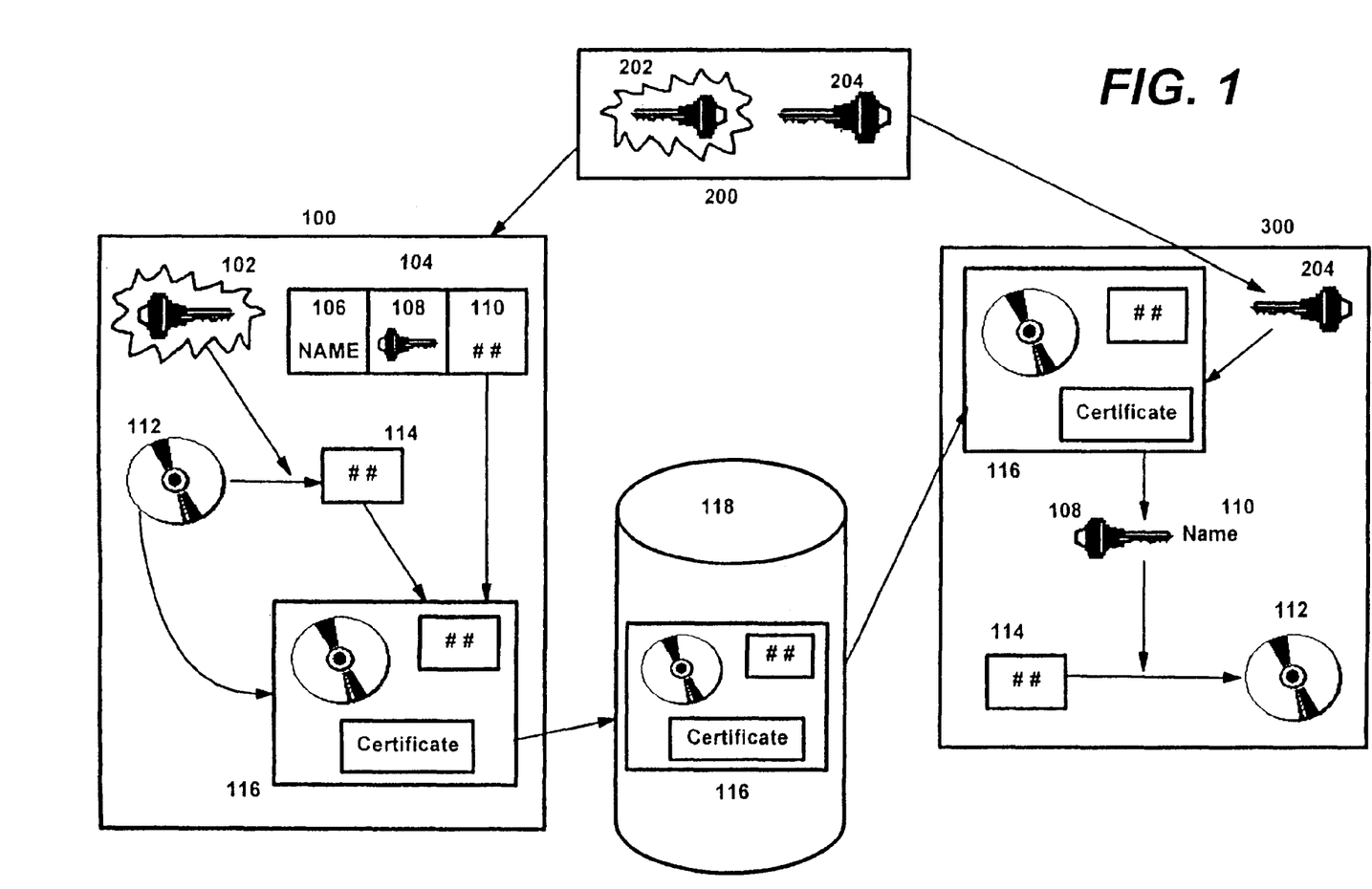
FIG. 1 is a schematic diagram showing the functioning of an authentication system of the prior art.

FIG. 1 is a schematic diagram of the prior art system used by Microsoft Authenticode™ for distributing executable code. The diagram shows three main parties: a publisher 100 an end user 300 and a certificate authority 200. To publish software over the Internet using Microsoft Authenticode™, publisher 100 must first apply to certificate authority 200 for a private and public key pair and for a certificate. Certificate authorities, such as Verisign Inc., are in the business of providing private and public key pairs to receiving parties. Moreover, they are responsible for checking the bona fides of their receiving parties and for providing digital certificates which may be provided as proof that the public key belongs to the receiving party and not a third party. On successful application, publisher 100 is provided with a private key 102 and a certificate 104 by certificate authority 200. Certificate 104 contains the name 106 of the publisher, a public key 108 provided to the publisher and a digital signature 110 from certificate authority 200 computed over both name 106 and public key 108. Certificate authority 200 generates digital signature 110 using its own private key 202, of which the corresponding public key 204 is made widely available to end users by being pre-installed in browsers such as Netscape Navigator™ and Microsoft Internet Explorer™. This digital signature 110 serves to confirm that public key 108 contained in certificate 104 belongs to publisher 100. For a detailed explanation of certificate authorities and digital certificates see "Internet Cryptography" by Richard E. Smith, 1997, published by Addison Wesley Longman, Inc., in particular chapter 12.

Having developed software 112, publisher 100 encrypts the software using his/her private key 102 to generate an encrypted version 114. Unencrypted software 112, encrypted software 114 and certificate 104 are then bundled together to form a package 116. This package is made available for downloading by placing it on a web server 118. End user 300, who downloads package 116 from web server 118, is able to authenticate software 112 as follows. Pre-installed in the end user's browser is public key 204 belonging to certificate authority 200. Using this, the end user is able to confirm that public key 108 contained in certificate 104 belongs to publisher 100. This is because the browser is able to decrypt digital signature 110 using public key 204 and compare the result with name 106 and public key 108 and because certificate 104 was signed by certificate authority 200, which the browser trusts. Using public key 108 obtained from certificate 104, the browser is able to decrypt encrypted version 114 of software 112 and compare it to the unencrypted version of the software also provided. If the two match, the browser knows that software 112 originates from publisher 100 and, furthermore, that it has not been modified since being encrypted. Thus, end user 300 is able to authenticate the source and integrity of software 112.

One disadvantage with the approach taken by Microsoft Authenticode™ is that it does not offer security from the program code provider directly—i.e. it does not allow the program code provider to act as a sole certificate authority or a low level certificate authority within a hierarchical certification system (see below for an explanation of these terms). One result of this disadvantage is that it does not allow the program code provider to arrange a level of security appropriate for its own purposes, the type of program code provided or the requirements of its receiving parties. A further result is that it does not engender trust of the program code provider directly since the authentication process appears to the receiving party to bear no relation to the program code provider but rather to Microsoft™.

N Islam et al 'A Flexible Security Model for Using Internet Content' IBM Thomas J. Watson Research Center Publication, 28 Jun. 1997, XP 002138803 describes a system for downloading content over an untrusted network, such as the Internet, and for controlling its use on a client device, content is stamped using digital signatures and analysed by a stamped content usage system to verify the identity of the creator of the content and to verify that it has not been modified.

The present invention addresses in general the security problems of providing content over the Internet identified above as well as the particular disadvantages of the approach taken by Microsoft Authenticode™ identified above. One objective of the present invention is to provide an easy to use system for providing verifiable content over a public data network such as the Internet. A further or alternate objective of the present invention is to provide a system for the provision of a news service over a public data network such as the Internet.

SUMMARY OF THE INVENTION

A method of verifying an item of digital content, the method comprising the steps of:

providing, at a first time, an item of digital content to a verifying program;

the verifying program performing verification of the item of digital content; and the verifying program presenting a message to a user indicating whether the item of digital content is verified or not;

characterised in that:

the user provides, at a second time earlier than the first time, a data item to the verifying program, the verifying program stores the data item, and the data item, or data derived from the data item, is included in the message to indicate to the user that the item of digital content was verified by the verifying program.

According to a second aspect of the present invention, there is provided a computer program for verifying an item of digital content, the computer program being arranged to:

receive, at a first time, an item of digital content;
verify the item of digital content; and
present a message to the user indicating whether the item of digital content is verified or not;
characterised in that:
the computer program is arranged to query, at a second time earlier than the first time, a user for a data item, and to store the data item, and in that the data item, or data derived from the data item, is included in the message to indicate to the user that the item of digital content was verified by the computer program.

According to a third aspect of the present invention, there is provided a method of providing a user with a verifiable item of digital content, the method comprising the following steps:

displaying, on a display of a client device, an item of digital content; characterised by:
displaying, on the display of the client device, a user interface, operable by a user of the client device to commence execution, at the client device, of a computer program for verifying the item of digital content.

According to a fourth aspect of the present invention, there is provided one or more data packages comprising:

data representing an item of digital content, capable of being displayed on the display of a client device;
characterised in that:
the one or more data packages comprise data representing a user interface, displayable on the display of the client device, and operable by a user of the client device to commence execution, at the client device, of a computer program for verifying the item of digital content.

Because news is essentially factual content which, although of limited currency, is often of significant economic value, fraudulent third parties are often known to attempt to make financial or other gain from the dissemination of false news. As the perceived value of news depends much on its source, a third party may gain most by the impersonation, modification or substitution of content from a trusted news service. For instance, with the provision of financial news, such as stock market news, third parties may gain by disseminating misleading or false information whilst masquerading as the trusted news service. On the other hand, susceptibility to this kind of fraudulent activity could have damaging consequences for the reputation of a provider of news service. The above aspects of the invention are intended to provide ways to reduce such risks.

There now follows, by way of example only, a detailed description of preferred embodiments of the present invention in which:

BRIEF DESCRIPTION OF THE DRAWINGS

FIG. 6 is a print out of a web page showing a bogus news item and a message indicating that the news item has been modified according to the present invention.

DETAILED DESCRIPTION OF THE PREFERRED EMBODIMENTS

PKI techniques are well known to those skilled in the art and generally depend on the fact that certain mathematical computations that are easy to compute in one direction are extremely difficult to compute in the other direction. The present invention is based on the algorithm developed by Ron Rivest, Adi Shamir, and Len Adelman of the Massachusetts Institute of Technology, known by those skilled in the art as the RSA algorithm, which relies on the fact that it can be relatively easy to multiply large prime numbers together but almost impossible to factor the resulting product.

PKI techniques, such as the RSA algorithm, allow pairs of keys to be generated which can be used to encrypt data or to digitally sign data. One of the keys is called a "public key" and the other a "private key". The private key is kept secret whereas the public key can be distributed freely. Data encrypted using the public key can only be decrypted by using the private key. This provides a mechanism whereby data can be transmitted over public networks in secret and can only be decrypted by the holder of the private key. Conversely, data encrypted using the private key can be decrypted by anyone holding the public key, but, crucially, any data which can be decrypted by the public key can only have been encrypted using the private key. This provides a mechanism whereby the holder of the private key can digitally sign data for transmission over a public network in such a way that anyone who holds the public key can verify that the data originates from the holder of the private key and that the data has not been modified since encryption. For a detailed explanation of PKI techniques and the RSA algorithm, see "Internet Cryptography" by Richard E. Smith, 1997, published by Addison Wesley Longman, Inc., in particular chapter 9. The computer programs of the present invention have been developed using application program interfaces (APIs) providing PKI, namely, the Baltimore PKI-Plus™ develops toolkit (see http://www.baltimore.com).

First Embodiment

Figure 2:
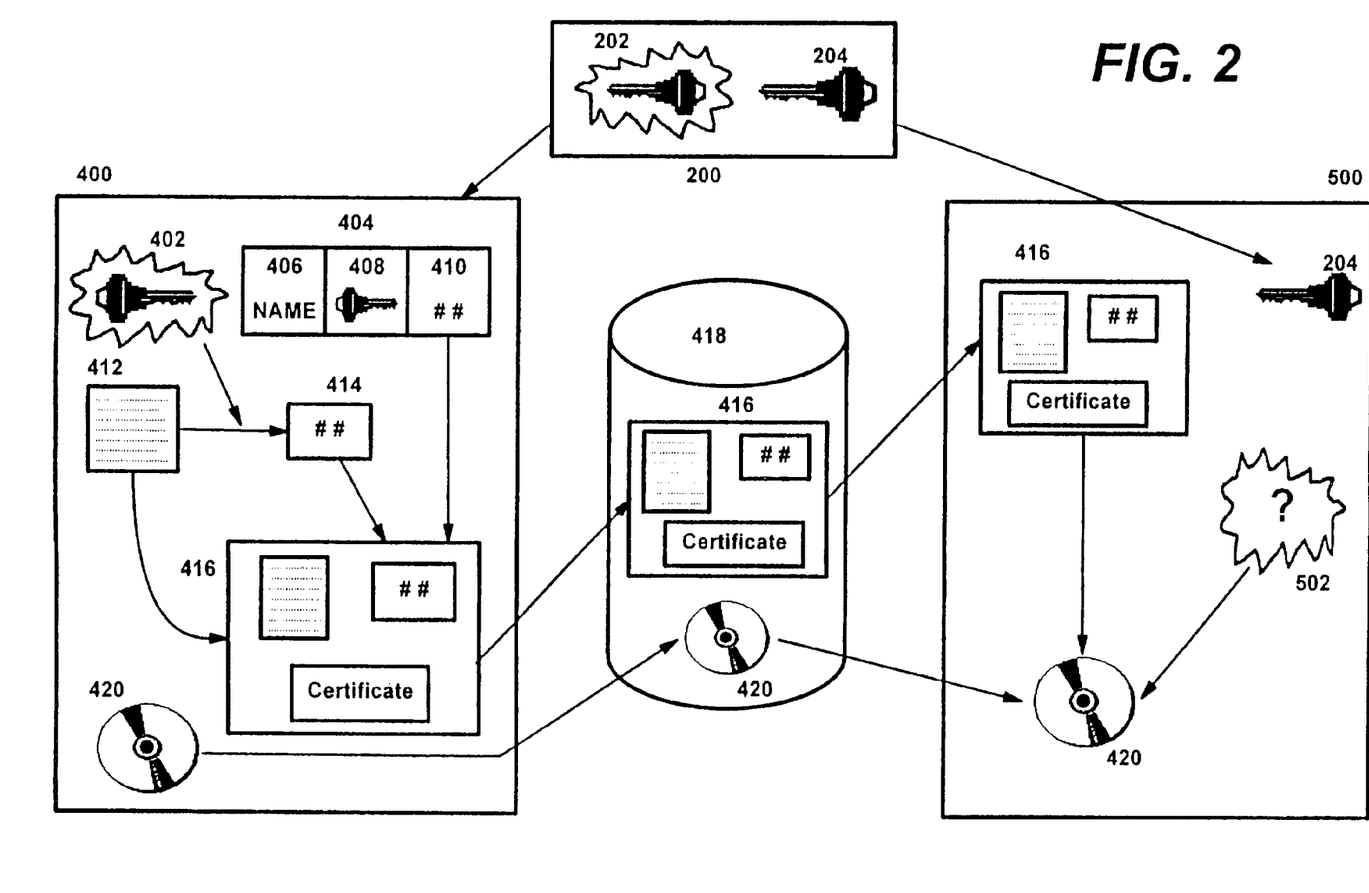
FIG. 2 is a schematic diagram showing the functioning of the verification system of the present invention.

FIG. 2 is a schematic diagram of a first embodiment of the present invention. A news provider 400 first applies to a certificate authority 200 to be provided with a private key 402 and a digital certificate 404 containing the name 406 of the news provider 400, the public key 408 corresponding to private key 402, and the digital signature 410 of certificate authority 200, as has been described above. News provider 400 generates a plain text news item, stored on a news server (not shown), and presents it in a browser-readable page of a format such as hyper-text mark-up language (HTML) or extensible mark-up language (XML) to form marked-up news item 412. News provider 400 encrypts the news item using its private key 402 thus generating an encrypted version 414 of the news item.

Unencrypted news item 412, encrypted version 414 and certificate 404 are then bundled together to form a package 416 which is posted to a web server 418 for access by receiving parties. Also posted to web server 418 is a verifying program 420, the function of which is described in detail below. A receiving party 500, who wishes to access news item 412, first downloads package 416 from web server 418. The receiving party may then make use of the unencrypted news item without any verification if he/she desires. However, receiving party 500 may wish to verify that news item 412 was generated by news provider 400 and that it has not been modified. To do this, the receiving party downloads verifying program 420 from web server 418 and stores it locally, if he/she has not already done so in respect of a previous news item accessed.

Figure 3:
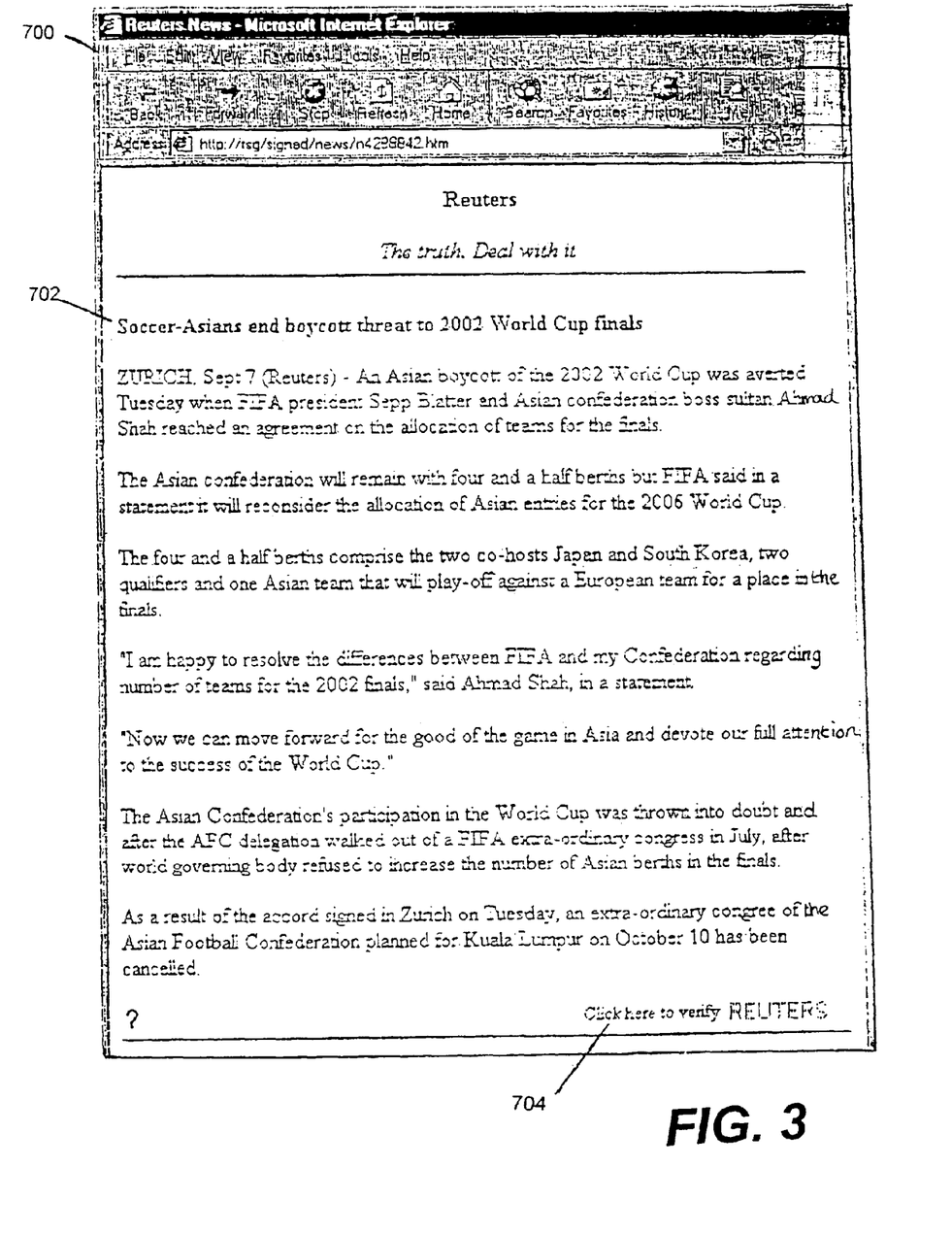
FIG. 3 is a print out of a web page showing a news item and means for commencing execution of the verification program of the present invention.

Receiving party 500 downloads package 416 containing news item 412 using a browser application such as Netscape Navigator™ or Microsoft Internet Explorer™. The browser-readable page includes a link or other suitable means for downloading and launching verifying program 420. Preferably, this takes the form of a part of the browser-readable page comprising the text "Click here to verify" which when clicked on by the receiving party activates executable code embedded in the browser-readable page which first checks whether verifying program 420 has already been downloaded. If it has, execution of verifying program 420 is commenced immediately. If not, verifying program 420 is first downloaded from web server 418 before commencing execution. The executable code embedded in the browser-readable page is implemented using a Java™ applet or Java Script™. FIG. 3 shows a web page 700 as displayed using a browser which comprises a news item 702 and a link 704 for downloading and/or launching verifying program 420.

Preferably, verifying program 420 takes the form of a plug-in which interoperates with the receiving party's browser. With Microsoft Internet Explorer™, the plug-in verifying program 420 is implemented as an ActiveX™ control or component. The verifying program is stored locally to the receiving party browser and generally needs only to be downloaded once, i.e. when the receiving party user first requests verification of the news item 412. Preferably, the verifying program 420 is itself downloaded in a verifiable manner using digital signature techniques for distributing program code such as Microsoft Authenticode™ described above with reference to FIG. 1.

Verifying program 420 is separate from news item 412 and package 416 and, further, that it is downloaded independently. This is because a third party attempting to impersonate news provider 300 may create a browser-readable page containing its own news item together with a bogus verifying element which gives the illusion that the news item originates from the trusted news provider and that it has not been modified. However, despite having downloaded verifying program 420 independently of package 416, there remains the possibility that a third party impersonating news provider 400 makes a browser-readable page available to receiving party 500, which contains a bogus verifying link resembling the news provider's link for launching or downloading verifying program 420. The third party may have arranged for the bogus link to provide a false verification of the news item. For instance, the bogus link may cause the execution of an embedded Java™ applet or Java™ script which mimics the operation of verification program 420 but which obviously, does not and cannot perform a bona fide verification.

To prevent this type of activity fooling receiving parties into believing they have received bona fide news from a trusted news provider, an extra level of security is provided. This extra level of security is provided by requiring receiving party 500 to enter a shared secret 502 at the request of verifying program 420 before it is first used to verify the news item. The shared secret can be any form of information, data or code entered by the receiving party user and is stored locally to the client device, preferably in an encrypted format. It is a shared secret in the sense that it is secret to and shared between the receiving party and the verifying program. Verifying program 420 displays shared secret 502 to the receiving party upon verification of the news item to prove that it is the original verifying program and not a bogus link in a page made available by a third party. A bogus link in a page provided by a third party cannot fool a receiving party that it is the original verifying program because it will not know of or have access to shared secret 502. Even if the third party is aware that shared secrets are used, the bogus link, when implemented as an embedded Java™ applet or Java™ script will, generally, not have access to the client device where shared secret 502 is stored. In any event, it will not have the key necessary to decrypt the encrypted shared secret.

The process of verifying news item 412 using the verifying program will be described in detail later in this document.

Second Embodiment

According to a second embodiment of the present invention, which is a variant of the first embodiment described above, package 416 contains one or more certificates (not shown) in addition to certificate 404. These additional certificates are part of a certification hierarchy in which certificate authority 200 is at the top level and provides the root public key, i.e. public key 204 and certificate 404 is at the lowest level and provides the public key necessary for verification—i.e. public key 408. Public key 204 is used by verifying program 420 to validate an additional certificate at one level lower in the hierarchy, which certificate may itself contain a public key for validating a further additional certificate, and so on down the hierarchy. The penultimate certificate contains the public key for validating certificate 404. As with the first embodiment, certificate 404 contains public key 408 corresponding to private key 402 which belongs to news provider 400. Again, as with the first embodiment, news item 412 is encrypted using this private key to generate encrypted version 414, and verifying program 420 uses public key 408 to decrypt encrypted version 414 when performing its verification.

Third and Fourth Embodiments

According to third and fourth embodiments of the present invention, which are, respectively, variants of the first and second embodiments described above, news provider 400 is itself a certificate authority and generates its own provate key 402, public key 408 and certificate 404 for use as described above. Furthermore, news provider 400 also owns private key 202, which it uses to sign certificate 404, and public key 204 which is installed in client devices for validating certificate 404.

Figure 4:
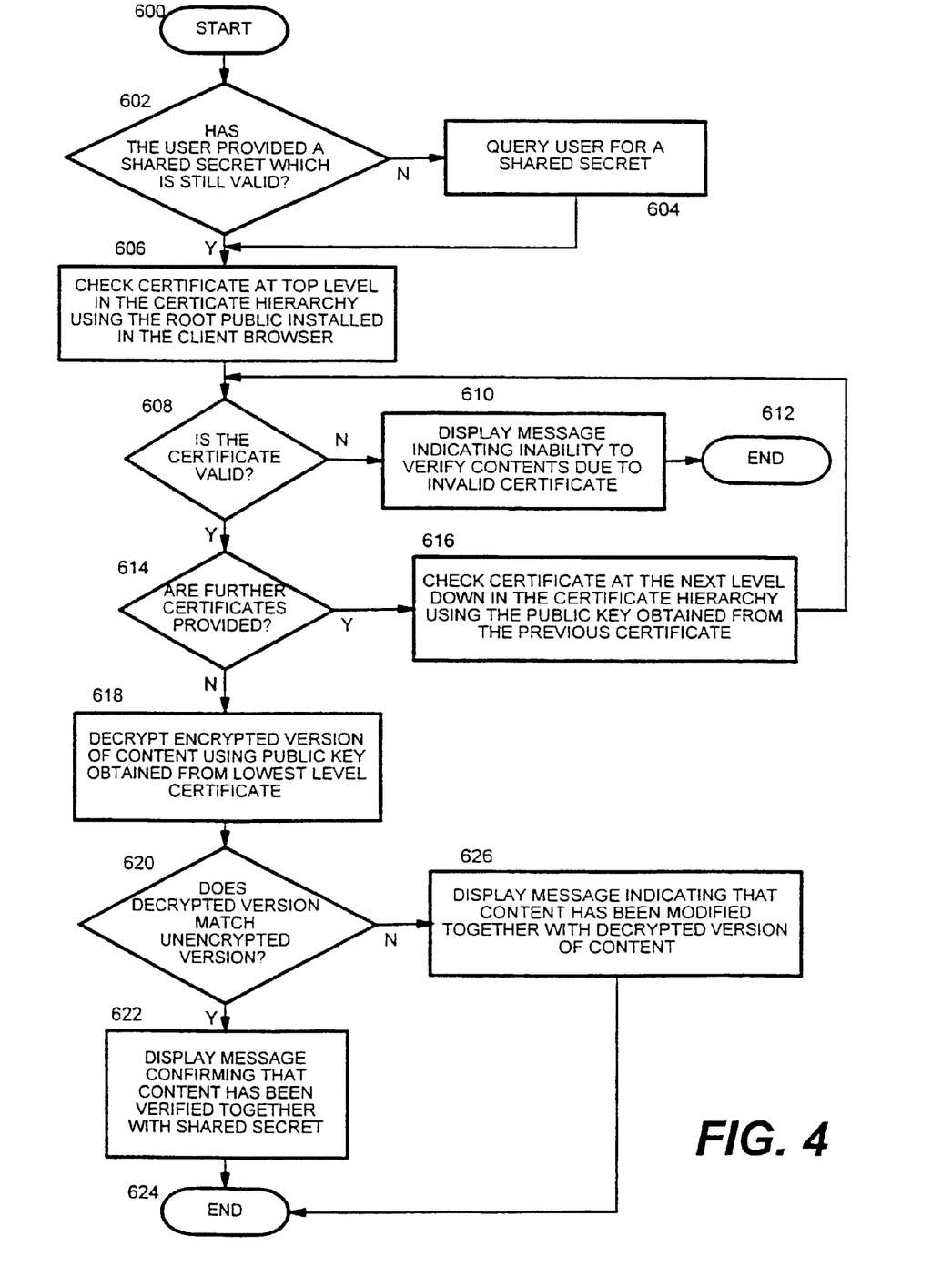
FIG. 4 is a flow diagram representing the procedure followed by the verifying program of the present invention.

FIG. 4 is a flow diagram representing the procedure followed by verifying program 420 for verifying news item 412 provided in package 416 according to all the embodiments described above. The procedure starts at step 600. At step 602, the verifying program determines whether receiving party 500 has provided a shared secret which is still valid. If not, at step 604 receiving party 500 is queried for a shared secret and the verifying program continues to step 606. For example the receiving party may enter 'The cat sat on the mat' as his/her shared secret. Preferably, known methods of managing passwords are used to by verifying program 420 to manage shared secrets. In one variation of the embodiments of the present invention, shared secrets remain valid for a predetermined period after which a new shared secret is required from the receiving party. In another variation, shared secret 502 remains valid for the lifetime of verifying program 420.

If receiving party 500 has provided a shared secret which is still valid, verifying program 420 proceeds to step 606 at which the certificate at the top level in the certificate hierarchy is checked using the root public key installed in the receiving party browser. In the first and third embodiments, there will be only one certificate provided in package 416—i.e. certificate 404- and this will thus be the toop level certificate. At step 608 the verifying program checks whether the certificate is valid. The process of validating the top level certificate involves decrypting the digital signature of the certificate using root public key 204 and comparing the results obtained with the name and public key contained in the certificate. If they do not match, verifying program 420 proceeds to step 610 at which a message is displayed indicating the inability to verify the news item due to an invalid certificate. The verifying program then terminates a step 612.

If the certificate is valid verifying program 420 proceeds to step 614 at which point it determines whether there are further certificates provided in package 416. This will be the case according to the second and fourth embodiments of the present invention. If there are further certificates, the verifying program proceeds to step 616 at which the certificate at the next level down in the certificate hierarchy is checked using the public key obtained from the previous certificate. The verifying program returns to step 608 to check the validity of the certificate and the process continues as described above until there are no further certificates to check and all the certificates have been validated at which point the verifying program proceeds to step 618.

Figure 5:
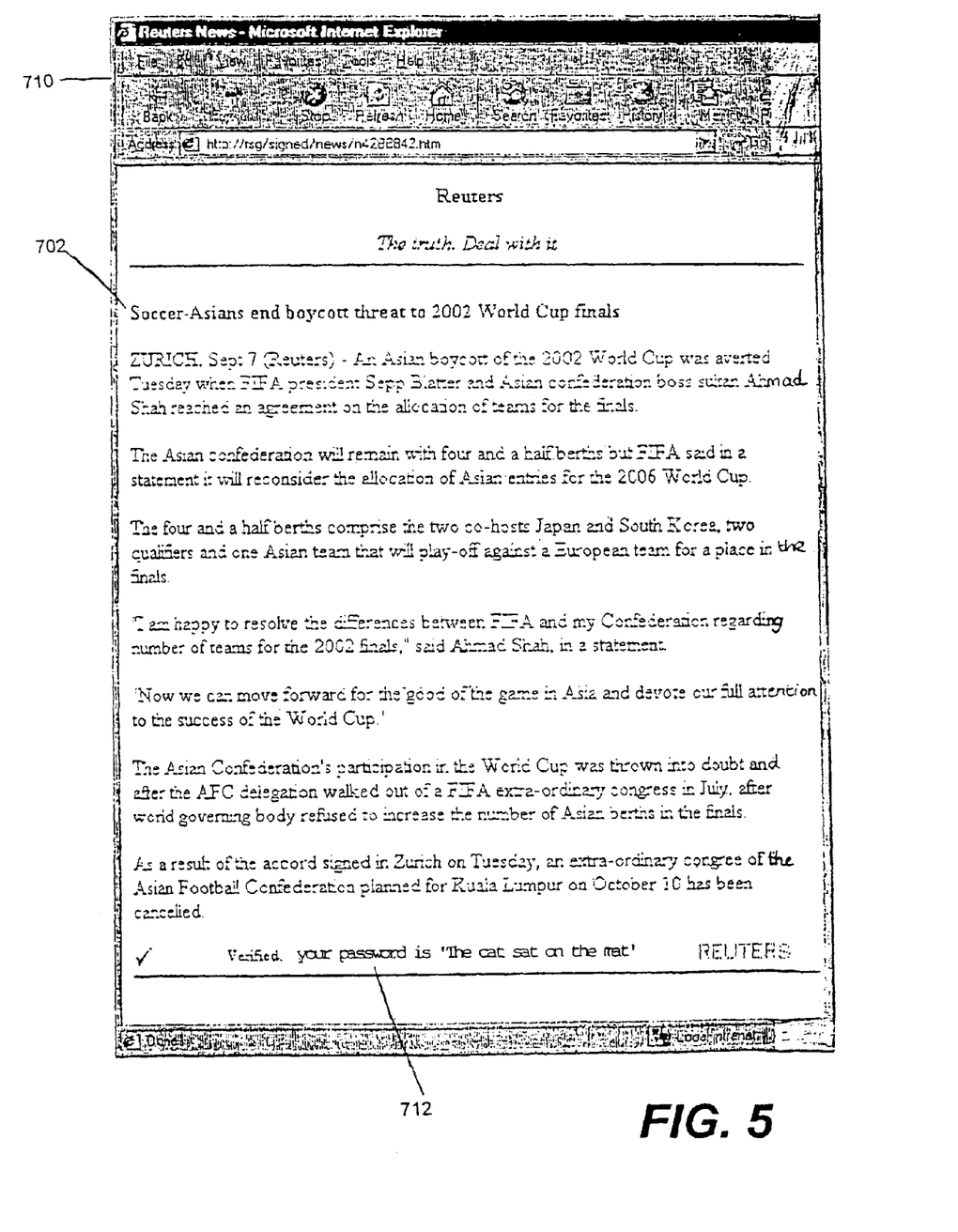
FIG. 5 is a print out of a web page showing the news item and a message verifying the news item according to the present invention.

At step 618, verifying program 420 decrypts the encrypted version of the news item provided in the package 416 using public key 408 obtained from the lowest level certificate, i.e. certificate 404. At step 620 the verifying program checks whether the decrypted version of the news item matches the unencrypted version of the news item. If it does, the verifying program displays a message at step 622 confirming that the news item has been verified and also displays shared secret 502 to confirm its identity to receiving party 500. FIG. 5 shows a web page 710 comprising the news item 702 of FIG. 3 together with confirmation of verification and shared secret 502 'The cat sat on the mat' 712. The verifying program then terminates at step 624 of FIG. 4.

Figure 7:
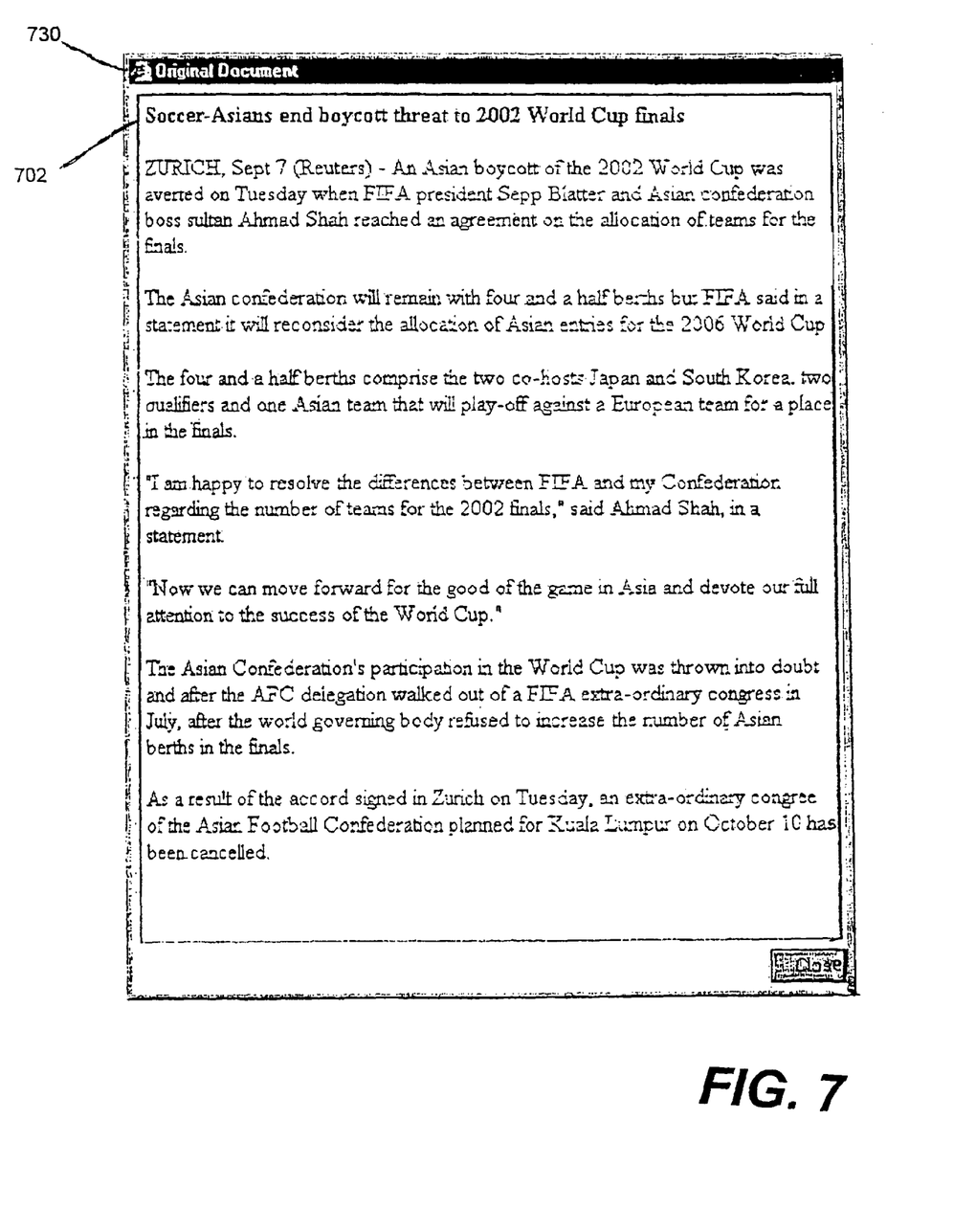
FIG. 7 is a print out of a web page showing the original unmodified news item according to the present invention.

If the news item does not match, the verifying program displays a message at step 626 indicating that the news item has been modified and also displays the decrypted version of the news item. FIG. 6 shows a web page 720 comprising a bogus news item 722 together with a message indicating that the original news item has been modified 724. FIG. 7 shows a web page 730 comprising the decrypted version of the news item 702. Verifying program 420 then terminates at step 624 of FIG. 4.

In one variant of embodiments of the present invention, verifying program 420 displays shared secret 502 at step 626 when displaying a message indicating that the news item has been modified.

Fifth to Eighth Embodiments

According to the fifth to eighth embodiments of the present invention, which are, respectively, variants of the first to fourth embodiments described above, no unencrypted version of news item 412 is included in package 416.

In these four embodiments, verification by receiving party 500 is necessary to obtain an unencrypted version news item 412. Thus, verifying program 420 must be used. Furthermore, verifying program 420 does not perform a match at step 620, but displays the decrypted version of the news item together with the shared secret and then terminates.

Ninth to Twelfth Embodiments

According to the ninth to twelfth embodiments of the present invention, which are, respectively, variants of the first to fourth embodiments described above, news item 412 is not encrypted in full. Instead, encrypted version 414 is a digital signature which enables verification but cannot be used to recover the original news item.

In these four embodiments, a full unencrypted version of news item 412 cannot be obtained from encrypted version 414. Thus, verifying program 420 does not perform a decryption at step 618, but checks the validity of unencrypted news item 412 using encrypted version 414. If news item 412 is valid, a message is displayed confirming that the confirming that the news item is valid together with shared secret 502. If not, a message is displayed indicating that the news item has been modified and verifying program 420 terminates.

In this document, the term "content" and cognate terms denote information, data or code of any kind whatsoever which is transmissible using digital technology. The term "verifying" and cognate terms denote the process of verifying the identity of a provider of content or verifying that the content provided has not been modified since being digitally signed by the content provider. The term "digitally signing" and cognate terms denote the process of adapting or adding data to content so that the identity of a provider of content and the integrity of the content itself can be verified. The terms "Internet client device" or "client device" and cognate terms denote a computer or other digital equipment capable of accessing or receiving content transmitted over a public data network. The terms "Internet server", "web server", "server" and cognate terms denote a computer or other digital equipment capable of transmitting content or making content available for transmission over a public data network. Further, the term "content provider" and cognate terms denote a party transmitting content or making content available for transmission over a public data network.

It will be appreciated that the embodiments described above are not intended to be limiting. Modifications and variants may be employed without departing from the scope of the present invention, which is defined in the accompanying claims.

The invention claimed is:
1. A method comprising:
receiving user input at a verifying program executing on a client computer, said user input comprising a shared secret data item, the shared secret data item including information that is a secret to and shared between a user of the client computer and the verifying program;
the verifying program storing the shared secret data item;
receiving by the verifying program from a server computer a content package comprising an unencrypted item of digital news content, an encrypted content item, and a digital certificate corresponding to a news provider;
decrypting by the verifying program the encrypted content item using a public key corresponding to the digital certificate;

verifying by the verifying program the unencrypted item of digital news content by comparing the unencrypted item of digital news content with the decrypted content item;

the verifying program displaying a result of the verifying of the unencrypted item of digital news content;

and the verifying program authenticating itself by displaying the shared secret data item.

2. The method of claim 1, wherein receiving the content package is subsequent to the verifying program receiving the shared secret data item.

3. The method of claim 1, wherein the wherein the content package is received over a public data network by a client computer together with a user interface component for commencing execution of the verifying program.

4. The method of claim 3, wherein the verifying program comprises a plug-in for an Internet browser application.

5. The method of claim 1, wherein the unencrypted item of digital news content is stored locally on a user client device.

6. One or more computer readable storage media storing computer executable instructions that, when executed by a client computer, causes the client computer to perform the steps of:

receiving user input at a verifying program executing on a client computer, said user input comprising a shared secret data item, the shared secret data item including information that is a secret to and shared between a user of the client computer and the verifying program;

the verifying program storing the shared secret data item;

receiving by the verifying program from a server computer a content package comprising an unencrypted item of digital news content, an encrypted content item, and a digital certificate corresponding to a news provider;

decrypting by the verifying program the encrypted content item using a public key corresponding to the digital certificate;

verifying by the verifying program the unencrypted item of digital news content by comparing the unencrypted item of digital news content with the decrypted content item;

the verifying program displaying a result of the verifying of the unencrypted item of digital news content; and the verifying program authenticating itself by displaying the shared secret data item.

7. The computer readable media of claim 6, wherein receiving the content package is subsequent to the verifying program receiving the shared secret data item.

8. The computer readable media of claim 6, wherein the wherein the content package is received over a public data network by a client computer together with a user interface component for commencing execution of the verifying program.

9. The computer readable media of claim 8, wherein the verifying program comprises a plug-in for an Internet browser application.

10. The computer readable media of claim 6, wherein the unencrypted item of digital news content is stored locally on a user client device.

* * * * *